Oct. 22, 1935. J. P. SHAW Re. 19,740

FREE REELING FISHING REEL

Original Filed April 27, 1932

Inventor

John Pierson Shaw

By Alexander Powell

Attorney

Reissued Oct. 22, 1935

Re. 19,740

UNITED STATES PATENT OFFICE 19,740

FREE REELING FISHING REEL

John Pierson Shaw, Craddock, Portsmouth, Va.

Original No. 1,897,499, dated February 14, 1933, Serial No. 607,861, April 27, 1932. Application for reissue September 7, 1934, Serial No. 743,165

17 Claims. (Cl. 242—84.1)

This invention is an improvement in fishing reels and the principal object of the invention is to provide a free-reeling fishing reel enabling the operator to perform all operations necessary to "land" a fish after being caught on the hook without the necessity of the operator's hand being removed from the crank which operates the spool, the reel being wound to wind in the line by a clockwise rotation of the crank, and the spool being secured by permitting the crank to assume a stationary position, and free rotation of the spool to feed out play in the line being permitted by initial counter-clockwise rotation of the crank, a brake on the spool being applied upon further counter-clockwise rotation of the crank. Hence after a fish is hooked the line may be wound in by clockwise rotation of the crank in the usual manner, but if the fish should give a certain jerk on the line a slight counter-clockwise rotation of the crank will allow the fish to take out play in the line, and should it be desired to retard this play in the line further counter-clockwise rotation of the crank will automatically apply a brake against free rotation of the spool whereby the motion of the fish may be checked. Hence without removing the hand of the operator from the crank the line may be drawn in, or played out, or frictionally checked at any time by the operator.

Other minor objects of the invention will be hereinafter set forth.

I will explain the invention with reference to the accompanying drawing which illustrates one practical embodiment thereof to enable others familiar with the art to adopt and use the same and will summarize in the claims the novel features of construction and novel combinations of parts for which protection is desired.

As shown, the reel preferably comprises a frame consisting of an end plate 1, and an end ring 2, connected together in spaced relation by bars 3 in the usual manner. Journaled within the frame is a spool 4 mounted on a shaft 4*a* having one end journaled in a suitable bearing in the end plate 1. The opposite end of the spool carries a plate 4*b* having an annular flange 4*c* adapted to rotatably fit within the ring 2.

Figure 1:
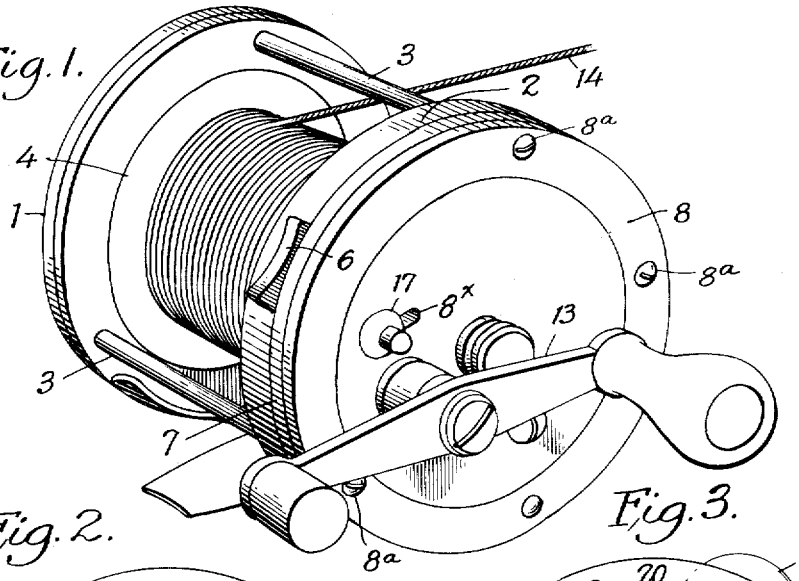
Fig. 1 is a perspective view of the fishing reel.
Figure 2:
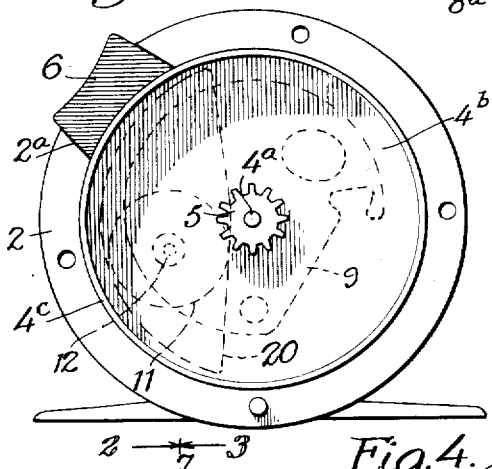
Fig. 2 is a plan view of the reel with the end plate carrying the crank removed, taken in the plane of the line 2—2, Fig. 5, showing in dotted lines the position of the spool brake, and of the pivoted plate carrying the rewinding gear which meshes with the pinion on the spool shaft.
Figure 5:
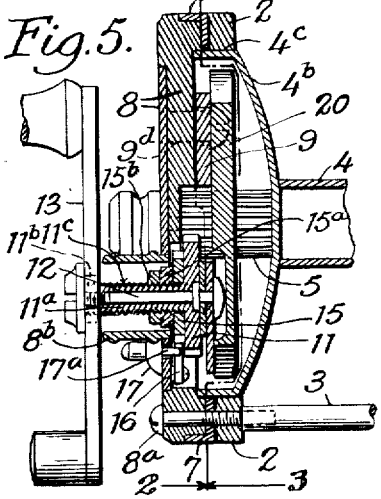
Fig. 5 is a section on the line 5—5, Fig. 4.

Preferably the end plate 4*b* is dished inwardly (Fig. 5) and the end of the shaft 4*a* projects into the dished portion of the end plate 4*b* and into a bore in the center of plate 8 (hereinafter described) and a pinion 5 (Fig. 2) is mounted upon the end of the shaft 4*a* whereby when the pinion 5 is rotated as hereinafter explained the reel 4 will be rotated.

In the ring 2 is a recess 2*a* preferably wider adjacent the flange 4*c* than at the outer periphery of the ring 2 and in the recess 2*a* is a friction block 6 corresponding in shape with the recess adapted to bear against the outer periphery of the flange 4*c* whereby when the block 6 is pushed inwardly rotation of the spool will be retarded. Preferably a ring 7 is placed over the ring 2 to maintain the block 6 in the tapered recess 2*a*.

Upon the outer ring 7 is mounted a plate 8 adapted to be secured to the bars 3 through the rings 7 and 2 by screws 8*a* which screws preferably are of sufficient length to enter tapped bores in the adjacent ends of the bars 3 of the frame.

On the inner face of the plate 8 is a metallic plate 9 pivoted as at 9*a*, said plate having a centrally disposed recess 9*b* of sufficient diameter to receive the pinion 5 on the end of the reel shaft 4*a*. Preferably opening 9*b* is elongated sufficiently to permit the plate 9 to pivot without touching the pinion 5. Plate 9 is provided with a recess 9*c*, and a pin or screw 9*d* is entered into the inner face of plate 8 through the recess 9*c* to limit the pivoting movement of plate 9. Plate 9 is normally held in the position shown in Fig. 3 by means of the bow spring 10 having one end 10*a* entered into the plate 8, the spring 10 being bowed around a pin 10*b* and the outer end of the spring engaging a lip 9*e* formed on plate 9 whereby the spring tends to pull the plate into the position shown in Fig. 3 at which time the screw 9*d* engages the end of the slot 9*c* furtherest removed from the lip 9*e*.

Figure 3:
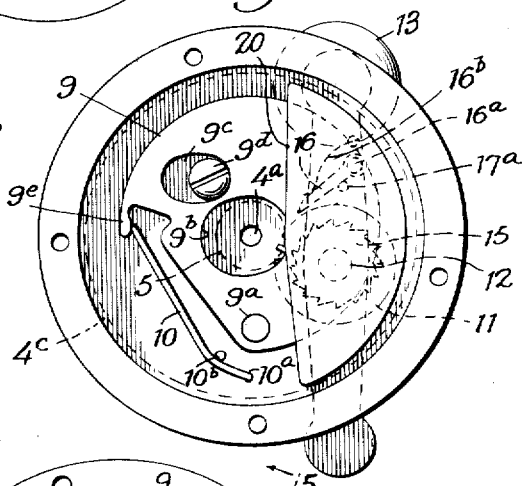
Fig. 3 is a bottom plan view of the end plate, taken in the plane of the line 3—3, Fig. 5, showing the gear on the crank shaft meshing with the pinion on the spool shaft, and showing the pivoted plate in position for normally bringing the gears into mesh, and also showing the spool brake carried by the pivoted plate.

Riveted to the plate 9, adjacent the central opening 9b is a stud shaft 12, extending through an enlarged tubular extension 8b projecting from the outer face of the plate 8 whereby the stud shaft 12 may move within the extension when plate 9 is pivoted. On the shaft 12 is a gear 11 abutting against the plate 9, said gear having a tubular extension 11a rotatably mounted on shaft 12, the extension also passing through the part 8b of plate 8 and beyond the end of the stud shaft 12. The outer end of extension 11a is squared as at 11b to receive the crank 13 by which the gear 11 is rotated. Gear 11 is adapted to normally mesh with pinion 5 on the reel shaft 4a when the plate 9 is in normal position, as shown in Fig. 3, whereby rotation of the crank 13 in a clockwise direction will rotate the reel shaft 4a to wind up the fishing line 14 on spool 4.

Extension 11a is externally threaded as at 11c, and on the extension 11a beside the gear 11 is a ratchet wheel 15 adapted to be engaged by a pawl 16 pivoted as at 16a on the plate 8. Ratchet wheel 15 has no threaded engagement with extension 11a, but is mounted so as to have a slip clutch engagement with the extension 11a. The slippage is controlled by a washer nut 15a also threaded on extension 11a which may be adjusted towards or away from the ratchet wheel 15 by means of a socket wrench applied through the plate extension 8b, the washer nut being locked in adjusted position by a lock nut 15b. The above slip clutch arrangement will avoid breakage of the fishing line 14 if the brake (hereinafter described) is applied too quickly. The pawl 16 normally engages the ratchet wheel 15 at a position adjacent the pinion 5, and a bow spring 16b engaging the side of the pawl tends to normally hold the pawl in contact with the ratchet wheel. Pawl 16 however may be pivoted out of mesh with the ratchet wheel as in Fig. 3 by shifting a slide 17 on the outer face of plate 8, said slide having a pin 17a (Fig. 5) entering a slot 8x in plate 8 and lying beside the pawl 16, whereby as the slide 17 is shifted the pawl will be correspondingly shifted against the action of the spring 16b out of engagement with ratchet wheel 15.

Figure 4:
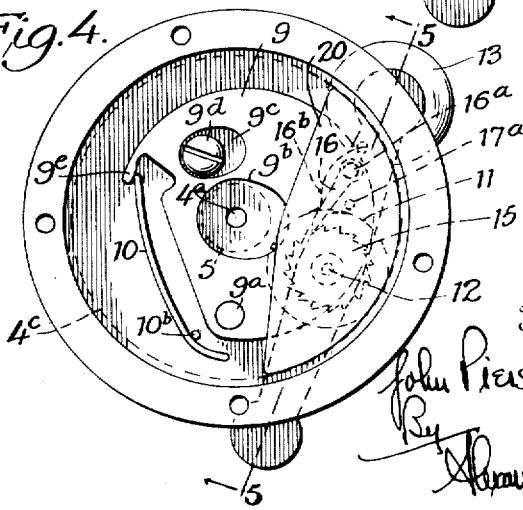
Fig. 4 is a view similar to Fig. 3 but showing the brake applied, and the pivoted plate swung to unmesh the driving gear with the pinion on the spool shaft.

By this construction when the pawl 16 is in engagement with the ratchet wheel 15 the crank 13 may be actuated to rotate the gear 11 in one direction to wind up the line 14 on the spool 4, the pawl overriding the ratchet teeth. The pawl however will prevent rotation of the gear 11 in the opposite direction; but as the pawl is pivoted on the fixed plate 8, and as the gear 11 is carried by the pivoting plate 9, when the operator attempts to rotate the crank 13 in a counter-clockwise direction the plate 9 will be shifted as in Fig. 4 by the pawl 16 and will move the gear 11 out of mesh with pinion 5 of the spool shaft, permitting the spool to rotate freely in either direction in the frame whereby the fish can play out the line 14 and no sudden jerks on the line can be had which might cause breakage of the line, rod or reel.

Continued attempt to rotate the crank 13 in a counter-clockwise direction however will further pivot the plate 9, while the gears 5 and 11 are out of mesh, and will bring a block of friction material 20 which is carried by the pivoting plate 9 into engagement with the inner periphery 4c of the spool end plate 4b (as in Fig. 4), thereby exerting a braking effect upon the spool while the gears 11 and 5 are unmeshed, the pressure of the brake 20 being in opposite direction from the pull of the line 14 on the spool 4, thus relieving the strain on the spindles and bearings.

The brake block 20 may be of any desired material, preferably leather, and its outer periphery is shaped to conform substantially with the contour of the flange 4c of the spool and constitutes in effect an internal expanding brake upon the flange 4c of the spool.

As soon however as the crank 13 is released the bow spring 10 will return the pivoting plate 9 to the position shown in Fig. 3 in which position the brake block 20 is disengaged from the flange 4c and the gear 11 remeshes with pinion 5 on spool shaft, and the crank 13 can then be used to wind up the spool in a clockwise direction.

When casting the slide 17 should be shifted to maintain the pawl 16 disengaged from the ratchet wheel 15, and the line may be freely played out from the spool without obstruction; and the thumb brake 6 may be used while casting to exert a slight friction on the exterior of the flange 4c to prevent tangling of the line by reason of the spool rotating faster than the line 14 is being played out.

By my novel construction the line may be cast and the auxiliary brake 6 used when casting to exert a slight braking effect on the reel to prevent overrunning and consequent tangling of the line while the crank 13 is rotating freely. When however the slide 17 is shifted to engage the pawl 16 with the ratchet wheel 15 the handle may be rotated only in a clockwise direction to wind up the line 14 on the spool, the pawl overriding the ratchet wheel.

However after a fish has been snagged and is tugging on the line, an attempt to then rotate the crank 13 in a counter-clockwise direction will initially unmesh the gears 11 and 5 to permit the line to be played out by the fish, and further effort to rotate the crank 13 counter-clockwise will further shift plate 9 to bring the brake block 20 into contact with the inner periphery of the flange 4c exerting an efficient frictional brake against the flange 4c of the spool to check the action of the fish; and hence crank 13 may be used to draw in and play out the line 14 without necessitating the operator removing his hand from the crank during the necessary operations required to land the fish.

I claim:—

1. In a reel of the character specified, a frame, a spool rotatably mounted therein, a pinion for rotating the spool; a movable gear journaled in the frame adapted to mesh wtih the pinion to rotate the spool in one direction to wind the reel; manual means for rotating the gear; yieldable means normally maintaining the gear in mesh with the pinion; a brake for the spool; said brake being inactive when the manual means is rotating to wind the reel; and means whereby attempted movement of the manual means in the other direction will initially unmesh the gear and pinion to permit free rotation of the spool and further attempted movement in said other direction will actuate the brake.

2. In a reel of the character specified, a frame, a spool rotatably mounted therein, a pinion for rotating the spool; a movable plate carried by the frame; a gear journaled on the plate adapted to mesh with the pinion; manual means for rotating the gear; means yieldably maintaining the plate positioned to bring the gear and pinion into mesh; a brake for the spool operated by the plate; said brake being inactive when the gear and pinion are in mesh; and means whereby attempted movement of the manual means in one direction will shift the plate and initially unmesh the gear and pinion and upon further attempted movement will actuate the brake, the yieldable means disengaging the brake and remeshing the gear and pinion when the manual means is released.

3. In a reel as set forth in claim 2, said yielding means comprising a flexed bow spring having one end fixed to the frame and the other end engaging the plate.

4. In a reel as set forth in claim 2, said plate shifting means comprising a pawl pivoted in the frame and permitting free rotation of the gear in one direction, the pawl preventing rotation of the gear in the other direction and causing the plate to pivot under attempted rotation of the gear in the other direction.

5. In a reel as set forth in claim 2, said plate shifting means comprising a ratchet wheel mounted beside the gear; a pawl pivoted in the frame and yieldably engaging the ratchet wheel permitting free rotation of the wheel in one direction, the pawl preventing rotation of the wheel in the other direction and causing the plate to pivot under attempted rotation of the wheel in the other direction.

6. In a reel as set forth in claim 2, said plate shifting means comprising a ratchet wheel mounted beside the gear; a pawl pivoted in the frame and yieldably engaging the wheel permitting free rotation of the wheel in one direction, the pawl preventing rotation of the wheel in the other direction and causing the plate to pivot under attempted rotation of the wheel in the other direction; and a slip clutch connecting the ratchet wheel with the gear.

7. In a reel as set forth in claim 2, a stud shaft mounted on said plate and extending through the frame, and said gear being mounted on the shaft and having an extension connected with the gear rotating means; a ratchet wheel on the extension beside the gear and engaged with the plate shifting means; and a slip-clutch connecting the ratchet wheel to the extension.

8. In a reel as set forth in claim 2, a stud shaft mounted on said plate and extending through the frame, said gear being mounted on said stud shaft and having an extension connected with the gear rotating means; a ratchet wheel on the extension beside the gear and engaged with the plate shifting means; a lock washer threaded on the extension beside the ratchet wheel, and a lock nut threaded on the extension and engaging the lock washer, said washer and nut being adjustable to permit slippage of the ratchet wheel on the extension.

9. In a reel of the character specified, a frame, a spool rotatably mounted therein and having a peripheral flange; a pinion within the flange for rotating the spool; a plate pivoted on the frame adjacent the pinion; a gear rotatably journaled on the plate adapted to mesh with the pinion; means for rotating the gear; means yieldably maintaining the plate in position to bring the gear into mesh with the pinion; a friction brake carried by the plate within the flange and normally disengaged from the flange when the pinion and gear are in mesh; and means whereby attempted rotation of the gear rotating means in one direction will shift the plate and initially unmesh the gear and pinion and whereby further attempted rotation in the same direction will engage the brake with the flange, and yieldable means disengaging the brake and remeshing the gear and pinion when the rotating means is released.

10. In a reel as set forth in claim 9, said yielding means comprising a lip extending from the edge of the plate; and a flexed bow spring having one end fixed to the frame and the other end engaging the lip.

11. In a reel as set forth in claim 9, said plate shifting means comprising a pawl pivoted in the frame and permitting free rotation of the gear in one direction, the pawl preventing rotation of the gear in the other direction and causing the plate to pivot under attempted rotation of the gear in the other direction.

12. In a reel as set forth in claim 9, said plate shifting means comprising a ratchet wheel mounted beside the gear; a pawl pivoted in the frame and yieldably engaging the ratchet wheel permitting free rotation of the wheel in one direction, the pawl preventing rotation of the wheel in the other direction and causing the plate to pivot under attempted rotation of the wheel in the other direction.

13. In a reel as set forth in claim 9, said plate shifting means comprising a ratchet wheel mounted beside the gear; a pawl pivoted in the frame and yieldably engaging the wheel permitting free rotation of the wheel in one direction, the pawl preventing rotation of the wheel in the other direction and causing the plate to pivot under attempted rotation of the wheel in the other direction; and a slip clutch connecting the ratchet wheel with the gear.

14. In a reel as set forth in claim 9, a stud shaft mounted on said plate and extending through the frame, and said gear being mounted on said stud shaft and having an extension connected with the gear rotating means; a ratchet wheel on the extension beside the gear and engaged wtih the plate shifting means; and a slip-clutch connecting the ratchet wheel to the extension.

15. In a reel as set forth in claim 9, a stud shaft mounted on said plate and extending through the frame, said gear being mounted on said stud shaft and having an extension connected with the gear rotating means; a ratchet wheel on the extension beside the gear and engaged with the plate shifting means; a lock washer threaded on the extension beside the ratchet wheel, and a lock nut threaded on the extension and engaging the lock washer, said washer and nut being adjustable to permit slippage of the ratchet wheel on the extension.

16. In a reel as set forth in claim 9, a hand brake mounted on the frame engaging the outer periphery of the spool flange.

17. In a reel as set forth in claim 9, means for rendering the plate shifting means ineffective.

JOHN PIERSON SHAW.